July 2, 1957 E. S. PETERSON 2,798,212

IMPULSE STORAGE UNIT

Filed Dec. 1, 1953 2 Sheets-Sheet 1

INVENTOR.
EDWARD S. PETERSON
BY Wm. Walter Owen
ATTY.

IMPULSE STORAGE UNIT

Filed Dec. 1, 1953

INVENTOR.
EDWARD S. PETERSON
BY

ATTY.

United States Patent Office 2,798,212

Patented July 2, 1957

2,798,212

IMPULSE STORAGE UNIT

Edward S. Peterson, Elmwood Park, Ill., assignor to General Telephone Laboratories, Incorporated, a corporation of Delaware Application December 1, 1953, Serial No. 395,559

8 Claims. (Cl. 340—174)

This invention relates in general to telephone systems and more particularly to an impulse coding and storing unit for use in a telephone system.

It has been necessary in automatic telephone systems to have a means for temporarily storing digital series of impulses, for example in toll ticketing equipment.

Where such storage is necessary, the common method for storing the impulses has been the use of the so-called "WXYZ" method wherein decimal digits are translated into digits of a binary system and each digit is then stored in one of a plurality of relay groups. One such arrangement of storage relay groups is shown in the Gunning patent, No. 1,805,820. Since one group of relays is required for each stored digit, it is obvious that a large number of relays is necessary where a considerable number of digits must be stored. Obviously the cost becomes an important problem.

It is an object of this invention to provide a novel means for translating decimal digits into codes and for storing said codes.

It is another object of this invention to provide means whereby received digital series of impulses may be stored, then reproduced in a definite timing sequence independent of the rate at which impulses are received.

A feature of this invention is the storage of digits in coded form upon an endless magnetic storage medium.

A further feature is the provision for storing digits in coded form over the first half of the cycle of operation of the storage medium and for reproducing said digits in accordance with said code during the second half of the cycle of operation.

A further feature is the step-by-step movement of the storage medium during the recording half of its cyclic operation to equally space the records.

A further feature is the inexpensive, simplified means for translating decimal digits into digits of a binary system.

A further feature is the modulation of a bias voltage by a lower frequency signal in order to obtain better recording and pickup characteristics.

A further feature is the means for reproducing the coded signals in a definite-timed sequence.

Other features will be evident during the course of the following description in which:

Figs. 1 and 2 show the impulse storing unit including a switch with its control circuits and a magnetic drum together with its associated equipment.

The present invention discloses a rotary switch, the wipers of which are stepped to a predetermined set of contacts in response to a received digital series of impulses. At the end of said series of impulses a gear reduction motor is started to move the magnetic drum; and simultaneously a low frequency signal is super-imposed upon a bias voltage in predetermined recording heads of a set of recording heads associated with the magnetic drum. Said predetermined recording heads are determined by the connections between the set of recording heads and the switch bank contacts since the low frequency signal is extended to the recording heads by way of said above-mentioned predetermined contacts.

The predetermined recording heads impress the low frequency component of the modulated signal upon that portion of the magnetic drum surface which moves past them.

After a short time interval, the low frequency signal is cut off; and the motor start circuit is opened to stop the drum. The drum however "coasts" a slight amount after its circuit is opened in order to provide spacing between successive records on the drum.

At the same time that the low frequency signal is cut off, a circuit is completed to restore the switch to normal.

This cycle of operation is repeated for each received series of impulses, a magnetic record of each series being impressed in code form upon the surface of the drum.

The preferred embodiment shown herein has been arranged so that the stored information will be utilized at the end of a telephone call; however it is obvious that said information could be utilized at any time after the receipt of all the series of impulses to be stored with only minor circuit changes.

When the stored information is to be removed, an alternate circuit is completed for starting the motor to rotate the drum.

A set of pickup heads, mounted in close proximity to the drum surface and 180° from the recording heads, pick up the coded signals stored on the drum surface, and send said signals to the control grids of tubes associated with the pickup heads. The associated tubes amplify the signals so picked up and cause relays associated therewith to operate. The contacts on said relays are arranged to decode the signals.

A means is provided for erasing each record on the drum after it has been picked up by the pickup heads.

When the drum returns to its normal position, contacts are operated to open the above-mentioned alternate circuit for operating the motor; and, as a result, the motor stops.

DETAILED DESCRIPTION

*Recording digits in coded form on the magnetic drum*

Figure 1:
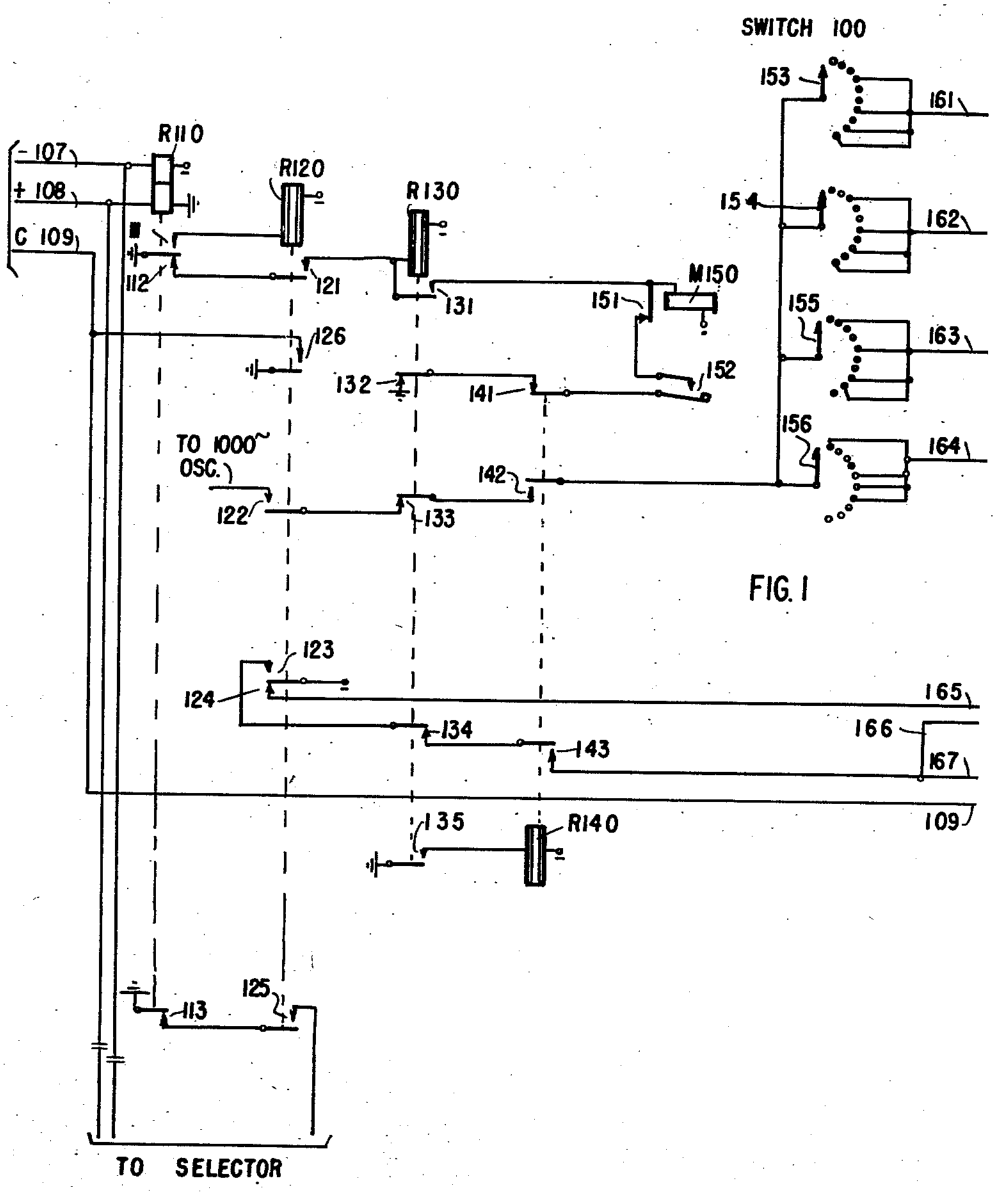
Figure 2:
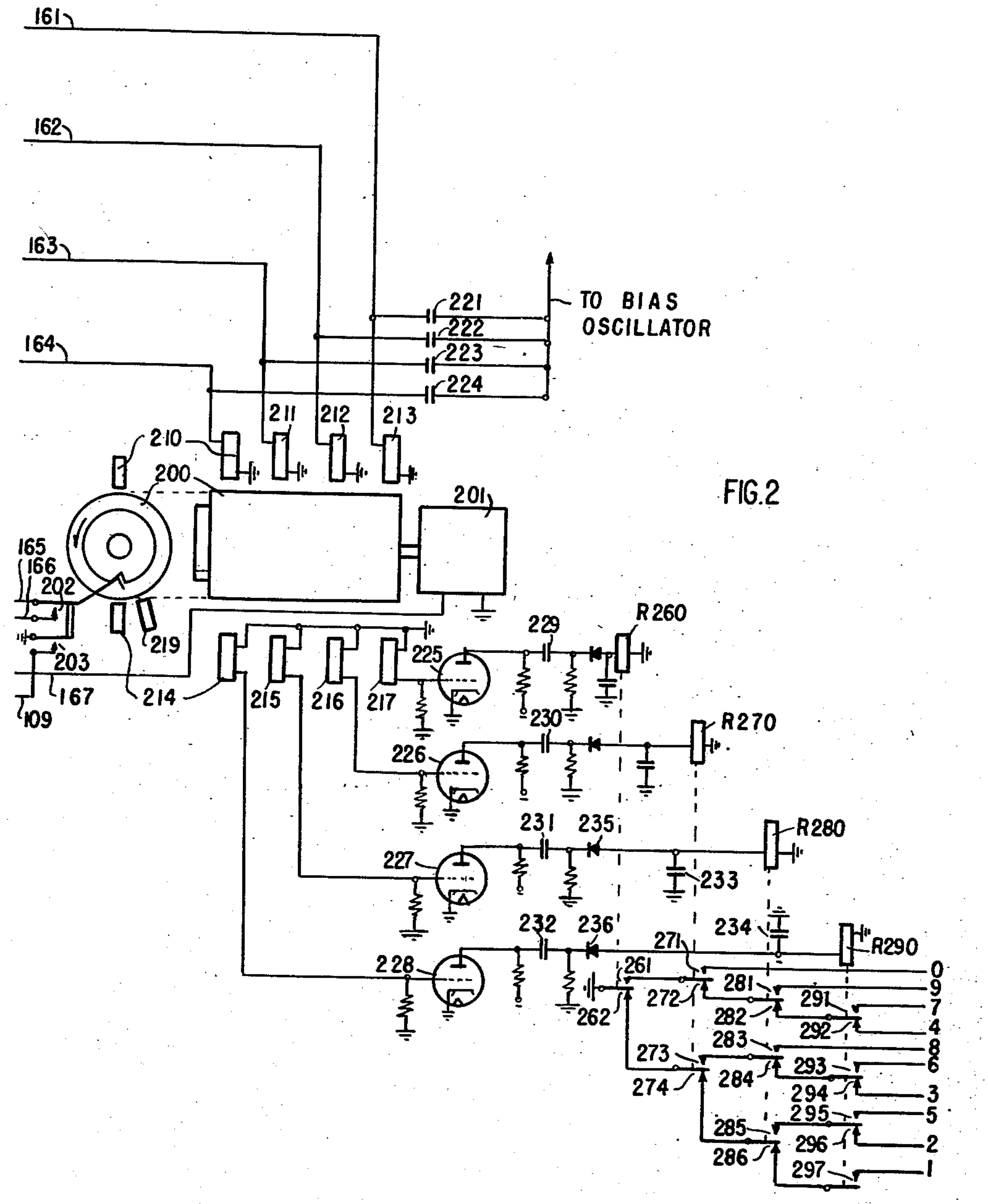

Assuming that a call has been initiated from a telephone subscriber substation and that said call has been extended by means well known in the art to conductors 107, 108 and 109 of Fig. 1.

Line relay R110 will be operated over the calling loop followed by the operation of hold relay R120 over an obvious circuit. At contacts 126, R120 extends ground to private conductor 109 to mark the storage unit busy; at contacts 122, prepares a point in the low frequency signal circuit; and, at contacts 123, prepares a point in the circuit for starting the gear reduction motor 201.

The number dialled by the calling subscriber is repeated in the preferred embodiment by way of contacts 113 of the line relay R110 and contacts 125 of hold relay R120 to complete connections to a called subscriber in a manner well known in the art.

With reference to the storing of said number, the first impulse of the first digital series of impulses will restore line relay R110 to close contacts 112, thereby to complete an obvious circuit for operating changeover relay R130, which relay operates contacts 131 to complete an obvious circuit for energizing the motor magnet M150. Hold relay R120 is slow to release and does not restore. M150 steps the wipers 153, 154, 155 and 156 to the first bank contacts.

At the end of said first impulse, line relay R110 re-operates to open contacts 112 thereby to restore M150; but R130 is slow to release and maintains itself operated until the end of the series of impulses. At contacts 111, R110 re-completes the operating circuit for R120.

It will be noted that R130, when it operated in response to the first impulse, opened contacts 132 in the homing circuit of magnet M150; at contacts 133, opened a point in the low frequency signal circuit; at contacts 134, opened a point in the circuit for starting the motor 201; and, at contacts 135, completed an obvious circuit for operating timing relay R140.

At contacts 141, R140 opens a point in the homing circuit of magnet M150, at contacts 142, prepares a point in the low frequency signal circuit; and, at contacts 143, prepares a point in the motor start circuit.

Assuming a series of five impulses, the same cycle of operation will be repeated until the wipers 153 to 156 are stepped to their fifth bank contacts. At the end of the fifth impulse, R110 re-operates and now relay R130 restores after a short time delay. At contacts 132, R130 prepares a point in the homing circuit of M150; at contacts 133 and 134, completes the low frequency signal circuit and the motor start circuit respectively; and, at contacts 135, opens the operating circuit of the slow to release timing relay R140. The motor start circuit extends from battery over contacts 123, 134 and 143 and conductor 167 to motor 201.

Motor 201 starts to rotate the drum 200 in a counter clockwise direction; and, at the same time, the low frequency signal is extended from an oscillator (not shown) over contacts 122, 133 and 142 and the wipers 153, 154, 155 and 156 to the fifth bank contacts accessible thereto. It will be seen from the drawings that the fifth contacts of the top two levels are dead contacts while the fifth contacts of the lower two levels are connected by way of conductors 163 and 164 to the recording heads 210 and 211. As a result the low frequency signal is super-imposed upon a bias voltage, which bias voltage is extended from a bias oscillator (not shown) to the recording heads 210 and 211, as well as 212 and 213, by way of capacitors 221, 222, 223 and 224 which capacitors are of such size as to present a low impedance path for the bias voltage and a high impedance path for the low frequency signal so that a low frequency signal will not feed back into an unintended recording head.

The bias oscillator may be in continuous operation or may be started for example when hold relay R120 operates. It will also be noted that the bias voltage is not necessary; rather it is felt that a modulated signal produces a better record of the low frequency signal upon the magnetic drum. As is well known in the art, the movement of the drum surface passing the recording heads may be maintained at a speed fast enough to permit the low frequency signal to be impressed upon the drum surface but too slow to permit the high frequency bias voltage to be impressed thereon. A low frequency of 1000 cycles per second may be readily used with a bias signal of 35,000 cycles per second.

In view of the foregoing, it will be seen that the modulated signals are extended to the recording heads 210 and 211 and that the low frequency component thereof is impressed upon that portion of the surface of the magnetic drum 200 which rotates across said recording heads. It is to be noted that the unmodulated signal in recording heads 212 and 213 will not be impressed upon the drum.

In a predetermined time after the restoration of relay R130, the timing relay R140 restores to open the low frequency signal circuit at contacts 142 and motor start circuit at contacts 143. The motor does not stop instantly upon the opening of its start circuits; rather it coasts a slight amount. As a result, a definite lateral spacing is maintained between successive signal records. R140 further completes at contacts 141 a self-interrupting circuit including contacts 132, 141, off-normal contacts 152 of switch 100 and self-interrupting contacts 151 of motor magnet M150 for operating M150. M150 steps the wipers 153 to 156 to normal at which time off-normal contacts 152 open to open said circuit.

In a similar manner, succeeding series of impulses will be stored upon the drum surface in coded form.

It will be noted that, when the drum 200 was moved the first step after the receipt of the last impulse of the first series of impulses, the drum off-normal contacts 202 closed to prepare an alternate circuit for starting the motor 201; and the drum off-normal contacts 203 closed to provide an alternate circuit including conductor 109 for marking the impulse storage unit busy.

*Reproducing the digits stored on the magnetic drum*

Assume that it is desirable to remove the coded information from the drum after the termination of a call. When the calling subscriber replaces the handset on the cradle, the line relay R110 restores followed by the restoration of the hold relay R120.

When R120 restores, it closes contacts 124 to complete the previously mentioned alternate motor start circuit, which circuit extends from battery at contacts 124, over conductor 165, drum off-normal contacts 202, and conductor 166 to the motor 201. The motor rotates drum 200. A constant speed motor is preferable so that succeeding recorded signals will be picked up in a definite timed sequence.

As soon as that portion of the drum surface, having recorded thereon the first digit "5" in coded form, rotates across the pickup heads 214, 215, 216 and 217, the pickup heads 214 and 215 impress the recorded signals upon the grids of their respective tubes 227 and 228 in a manner well known in the art.

The 1000 cycle signals impressed upon the grids of tubes 227 and 228 are amplified and rectified to operate relays R280 and R290 by way of tubes 227 and 228, coupling capacitors 231 and 232, and rectifiers 235 and 236 in a manner well known in the art. Applicant has added capacitors 233 and 234, in order to be certain that the relays R280 and R290 will be maintained in their operated positions between succeeding crests of the amplified signal. That is, during that half of the cycle when current passes through rectifier 235, a charge is stored in capacitor 233; said charge being dissipated through relay R280 to maintain R280 operated during that half of the cycle when no current passes through rectifier 235.

Therefore R280 and R290 will be operated when signals are impressed upon the grids of tubes 227 and 228 respectively. When R280 and R290 are operated, they close contacts 285 and 295 respectively to extend ground from contacts 262 over contacts 274, 285 and 295 to the conductor marked "5." Thus the coded record is reproduced in decoded form.

The conductors 1 to 0 inclusive terminate in equipment wherein the stored information may be utilized, for example in toll ticketing equipment well known in the art.

As the magnetic drum 200 continues to rotate, the remaining series of impulses recorded thereon in coded form will be picked up by the respective pickup heads 214 to 217 inclusive and decoded in a similar manner by the contacts on relays R260 to R290 inclusive.

It is to be noted that, since the time interval, during which all signals are recorded on drum 200, is controlled by the release time of relay R140, since the coded records are equally spaced on the drum 200 and since the drum is rotated at a constant speed during playback, a constant and accurate time duration of decoded signals as well as equal time intervals between succeeding decoded signals may be had. A definite timing of signals such as this is often advantageous in automatic telephone systems.

As the portions of the drum 200 having signals recorded thereon pass the erase head 219 the signals are erased therefrom. A permanent magnet may be used for this purpose as is well known in the art.

When drum 200 returns to its normal position, off-normal contacts 202 and 203 are opened to respectively open the alternate motor start circuit to stop motor 201 and to remove the busy marking from the private conductor 109. The normal position of the drum and the off-normal contacts 202 and 203 can be arranged to allow for the slight coasting of the drum 200 before it stops.

The impulse storage unit is now ready to receive further information.

While there has been described what is at present considered to be the preferred embodiment of the invention, various modifications may be made therein; and it is contemplated to cover in the appended claims all such modifications as fall within the true spirit and scope of the invention.

What is claimed is:

1. An impulse storage device having incoming conductors over which impulses are received and comprising a rotatably mounted magnetizable drum, driving means for rotating said drum, a set of recording heads mounted in close proximity to said drum and across its rotary path of motion, a set of playback heads mounted in close proximity to said drum and across its rotary path of motion, means operated in response to each series of impulses received over said conductors for rendering certain of said recording heads effective and means operated in response to the termination of each series of impulses received for operating said driving means to rotate a part of the drum surface past said recording heads thereby to impress upon said drum surface part a magnetic record representative of each received series, means for thereafter operating said driving means to rotate said drum, said magnetic records effective as they pass said playback heads for controlling said playback heads.

2. An impulse storing device as claimed in claim 1 wherein said second means includes a source of alternating current and circuit means for connecting said source to the said certain of the said recording heads in response to the received series of impulses.

3. For use in a toll ticketing arrangement in a telephone system, a device for storing impulses received over incoming conductors associated therewith, said device comprising a rotatably mounted magnetizable drum, driving means for rotating said drum, means responsive to the termination of each series of impulses received over said conductors for operating said driving means to rotate said drum a predetermined amount, means for impressing coded magnetic records upon said drum, impulse responsive means for rendering said last means effective to impress magnetic records upon the drum surface in accordance with the number of impulses in the received series as said drum surface is rotated past said last means, pickup means associated with said drum and controlled in accordance with the records thereon as the magnetized drum surface rotates past said pickup means.

4. In a mechanism for translating digital series of impulses received over incoming conductors associated therewith into their corresponding binary numbers and for magnetically storing said translated numbers upon a rotatably mounted magnetizable member, a switch having a set of bank contacts for each digit and wipers having access to said contacts, a set of recording heads for magnetically impressing coded binary numbers upon said member, circuits connecting certain of said recording heads to each set of bank contacts, driving means for rotating said member, means for applying a signal to said recording heads by way of said sets of bank contacts, magnet means operated responsive to each digital series of impulses received over said incoming conductors for advancing said wipers to engage a certain set of bank contacts, means operated and effective upon the termination of each received series of impulses for rendering said second means effective and for operating said driving means to rotate a portion of said member past said recording heads to cause certain of said recording heads to magnetically impress said signal in coded form upon said portion of the member, means thereafter operated and effective to restore the switch to normal in preparation for the next series of impulses and read out means associated with said drum and controlled in accordance with the records impressed thereon as the drum is rotated past said read out means at the termination of all of the series of impulses received.

5. An impulse storing mechanism having incoming conductors over which impulses are received and comprising a switch having a set of bank contacts for each digit and wipers having access to said contacts, magnet means controlled by each series of impulses received over said incoming conductors for advancing said wipers to a predetermined set of said bank contacts, a rotatably mounted magnetizable member and a set of recording heads mounted in close proximity to the magnetizable surface of the member, circuits connecting certain of the recording heads to certain of the sets of bank contacts, a drive means for rotating said member, signalling means for applying a signal to said recording heads by way of said wipers, said predetermined sets of bank contacts and said circuits, a relay means operated and effective upon the termination of a received series of impulses for starting said drive means to rotate said member and for rendering said signalling means effective to cause certain of said recording heads to impress a coded magnetic record upon the magnetizable surface passing the recording heads, a timing means operated and effective after a predetermined time delay for stopping said drive means and for rendering said signalling means ineffective, and reproducing means mounted in close proximity to the magnetizable surface of said member for reproducing the signals in accordance with the magnetic records stored on the said member.

6. The impulse storing mechanism claimed in claim 5, wherein said reproducing means includes another means for operating the drive means to rotate the magnetizable member after all of the series of impulses have been received, and wherein the magnetic records stored on the member are effective to control said reproducing means as said records pass said reproducing means, and includes means controlled by said reproducing means for decoding the reproduced signals.

7. In an impulse translating and storing device, a rotatably mounted magnetic drum, a series of recording heads associated with said drum, said series mounted in a line across the rotary path of motion of the drum, a selecting switch, said series of recording heads connected to different sets of contacts in the bank of said switch in accordance with different codes, a relay arrangement, said arrangement operated by sets of incoming digital impulses to select a particular set of contacts corresponding to the digit of a received set of incoming impulses, means automatically operated after each set of incoming impulses are received to cause the particular ones of the recording heads, connected to the selected set of contacts, to be energized to impress a record on the drum in accordance with the code corresponding to the received series of impulses, pickup means associated with the drum, and means for thereafter rendering said pickup means effective to pick up the records on the drum and to translate said records back into digital markings.

8. In an impulse translating and storing device, a rotatably mounted magnetic drum, a series of recording heads associated with said drum, a selecting switch having a plurality of wipers and a contact bank having a plurality of levels associated respectively with said wipers, said recording heads connected respectively with predetermined contacts of each of said levels of said contact bank, relay means operated responsive to incoming digital impulses to advance each of said wipers to a particular contact in each of said levels corresponding to the number of said incoming digital impulses received, means, controlled by said relay means after the termination of said digital impulses received, for energizing the particular ones of said recording heads connected respectively to the said particular contacts in said levels to which said wipers have been advanced, said energizing of said recording heads impressing a record on the drum in accordance with the particular predetermined contacts over which said heads are respectively energized whereby said record corresponds to said incoming digital impulses, pickup means associated with the drum, and means for thereafter rendering said pickup means effective to pick up the records on the drum and to translate said records back into digital markings.

References Cited in the file of this patent

UNITED STATES PATENTS

| | | |
|---|---|---|
| 2,416,445 | Jensen | Feb. 25, 1947 |
| 2,546,829 | Mallina | Mar. 27, 1951 |
| 2,564,403 | May | Aug. 14, 1951 |